(12) United States Patent
Yu et al.

(10) Patent No.: US 7,776,231 B2
(45) Date of Patent: Aug. 17, 2010

(54) CHEMICAL MECHANICAL POLISHING SLURRIES, THEIR APPLICATIONS AND METHOD OF USE THEREOF

(75) Inventors: Chris Chang Yu, Shanghai (CN); Andy Chunxiao Yang, Shanghai (CN); Danny Zhenglong Shiao, Shanghai (CN)

(73) Assignee: Anji Microelectronics (Shanghai) Co., Ltd., Shanghai (CN)

( * ) Notice: Subject to any disclaimer, the term of this patent is extended or adjusted under 35 U.S.C. 154(b) by 470 days.

(21) Appl. No.: 11/918,956

(22) PCT Filed: Apr. 19, 2006

(86) PCT No.: PCT/CN2006/000717

§ 371 (c)(1),
(2), (4) Date: Oct. 22, 2007

(87) PCT Pub. No.: WO2006/111084

PCT Pub. Date: Oct. 26, 2006

(65) Prior Publication Data

US 2008/0190894 A1    Aug. 14, 2008

(30) Foreign Application Priority Data

Apr. 21, 2005    (CN) .......................... 2005 1 0026298

(51) Int. Cl.
*C09K 13/00* (2006.01)

(52) U.S. Cl. .................................................... 252/79.1
(58) Field of Classification Search ................. 252/79.1
See application file for complete search history.

(56) References Cited

U.S. PATENT DOCUMENTS

| | | | |
|---|---|---|---|
| 5,861,055 A | 1/1999 | Allman et al. | |
| 5,954,997 A | 9/1999 | Kaufman et al. | |
| 5,980,775 A | 11/1999 | Grumbine et al. | |
| 5,993,686 A | 11/1999 | Streinz et al. | |
| 6,063,306 A | 5/2000 | Kaufman et al. | |
| 6,068,787 A | 5/2000 | Grumbine et al. | |
| 6,569,350 B2 | 5/2003 | Kaufman et al. | |
| 6,620,037 B2 | 9/2003 | Kaufman et al. | |
| 6,679,761 B1 * | 1/2004 | Sunahara et al. | 451/41 |
| 6,801,581 B1 | 10/2004 | Francos et al. | |

FOREIGN PATENT DOCUMENTS

CN    1415114 A    4/2003

* cited by examiner

*Primary Examiner*—Roberts Culbert
(74) *Attorney, Agent, or Firm*—Jacobson Holman PLLC

(57) ABSTRACT

This invention disclosed a chemical mechanical polishing slurry, which includes at least one abrasive particle, an oxidant and a carrier. The oxidant is combined with a big metallorganic compound; and the applications and corresponding handling method are also disclosed. This invention slurry can realize high removal rate, no corrosion, low defectivity and high plan.

20 Claims, No Drawings

CHEMICAL MECHANICAL POLISHING SLURRIES, THEIR APPLICATIONS AND METHOD OF USE THEREOF

This is a national stage of PCT/CN2006/000717 filed Apr. 19, 2006.

TECHNOLOGY FIELD

This Invention is about the chemical mechanical polishing slurry technology, especially is about the chemical mechanical polishing slurries and disclosed slurries applications as well as corresponding handling methods.

BACKGROUND OF THE INVENTION

With the microelectronics technology fast development, today ultra large scale integrated chip has increased its integration density up to several billion devices per chip. So far, its feature size shrank into Nanometer level, which requires several hundred manufacturing processes, among them, especially that of being able to realize the global planarization of multilayer metallization, silicon substrate, dielectric materials etc. Chemical mechanical polishing (CMP) is one of the best planarization method, which has be proved in industry for decades.

For a typical chemical mechanical polishing method, the substrate to be polished is made to contact with the polishing pad directly. At the same time, a pressure is applied to the back of the substrate. During the polishing, polishing pad is rotated with the rotation of polishing platen, while a certain pressure applied to the substrate being polished, while the CMP slurry (composed of abrasives and reactive chemical components) are distribute onto the polishing pad. Thus, there would be the chemical mechanical polishing proceeded through, on the one hand, the chemistry reaction between CMP slurry and substrate surface film and on the other hand, the mechanical function. CMP slurry is one of the most important factors which influence the CMP performance. Oxidant was usually added into the CMP slurry to tune the polishing performance according to the polishing needs.

U.S. Pat. Nos. 6,620,037 6,569,350 and 6,063,306 reported hydrogen peroxide and urea hydrogen peroxide the as oxidant in CMP slurry U.S. Pat. No. 5,954,997 reported ammonia per sulfate as oxidant in CMP slurry U.S. Pat. Nos. 680,581 and 6,068,787 reported organic or inorganic peroxide as oxidant in CMP slurry U.S. Pat. No. 5,993,686 reported ferric salt, potassium salt, ammonium salt, quaternary ammonium salt, phosphonium salt, per oxide, chlorate, per chlorate, nitrate, permanganate or persulfate as well as their mixture, ferric nitrate etc. as oxidant in the CMP slurry. U.S. Pat. No. 5,980,775 reported hydrogen peroxide, organic peroxide, inorganic peroxide and their mixture etc as the oxidant in CMP slurry. But so far, the oxidant in the CMP slurry has some problems: the capability of oxidization is not strong enough, the speed of oxidization is not fast enough or the oxidant is not stable enough in CMP slurry. Therefore there is the need to find a new oxidant that can be put into CMP slurry to realize the uniform, high removal rate low defectivity, high planarization polishing performances.

SUMMARY OF THE INVENTION

The object of this invention is to provide a kind of novel CMP polishing slurry, which include at least an abrasive, an oxidant and an carrier. Especially, this oxidant is combined with a big metallorganic compound. Using big metallorganic compound as the oxidant carrier in CMP slurry is the novel point of this invention, which is not found in anywhere of other literature.

Among above, the oxidant are ozone, oxygen, compound containing oxygen, compound containing sulfate, compound containing peroxide or persulfur.

The content of the abrasive in CMP slurry is 1 wt. %~30 wt. %; the content of oxidant is 0.01 wt. %~10 wt. %; others are carrier and/or other additives.

The big metallorganic compound is composed of at least one metal atom or metal ion and one big water-soluble molecular or water soluble polymer; the big water-soluble molecular or water soluble polymer is the peptide chain formed by amino acid or polymer formed by amino acid derivates. The metal atom or metal ion is positioned in the center of the big molecular or polymer, while the metal atom or ion can be enlaced by the big molecular or polymer, while the metal atom or ion can expose its self partially or completely on the surface of big molecular or polymer.

This water soluble big molecular or polymer contains amido, carboxyl and hydroxyl and/or functional groups combined by them.

The big metallorganic compound is the hemoglobin or myoglobin or any other hemoglobin or myoglobin derivatives or their combination. Adding big metallorganic compound such as hemoglobin or myoglobin or their derivatives into the CMP slurry to disperse the oxidizer more stable, uniform and much higher concentration in CMP slurry; to make the oxidization film formed faster and make the make the oxidization layer more uniform during polishing.

The concentration of hemoglobin or myoglobin or their derivativesin CMP slurry is 0.1-50 wt. %.

The metal can be transition metal or rare earth. The transition metal are Fe, W, Co, Ta, Ni, Zr, Pd, Pt, Cu, Ag, Au, Zn, Cd and/or Hg; the rare earth are Lanthanide metals and/or Actinides metal.

The amino acid are histidine glycin alanine serine, proline valine, threonine, cysteine isoleucine leucine asparaginate asparagic acid lysine glutamic acid phenylalanine arginine tyrosine tryptophan, methionine, and/or glutamic acid.

The big metallorganic compound combined oxidant can exist on the surface or inside the polishing pad.

The CMP slurry's temperature is between, 0° C.-50° C., prefer 25° C.

The pH of this slurry is 3-12, and 6-8 is preferred.

The abrasive is selected from the one or several of $SiO_2$, Polymer, metallic oxide and metal particles; Among them, the metallic oxide are $Al_2O_3$, $CeO_2$, lanthanum oxide, samarium oxide, Copper oxide or $Cu_2O$ The metals are Cu, W, Al, Fe, Ni, Ag, Pt or Au.

The surface specific area of the abrasive is: 20-20000 mg.

The abrasive particle mean size is: 5-500 nm.

The abrasive can be selected from surface modified $SiO_2$, $Al_2O_3$, $CeO_2$, lanthanum oxide, samarium oxide, tungsten oxide, copper oxide or $Cu_2O$, organic or inorganic polymer or metal particle.

The abrasive can be empty core particle.

The abrasive can carry electric or magnetism.

The carrier can be solid or liquid. The liquid carrier is preferred to be the water or other organic solvent such as ethanol.

The CMP slurry further contain film forming agent, dispersant agent, catalyst agent, complexing agent, and pH buffing agent or their combination.

The other purpose of this invention is to provide the application of this invention slurry and its corresponding handling method.

The substrate can be Cu, Ta, TaN, W, Al, Ag, Ti, Ti or Au material the non-metal substrate is polymer, BPSG $SiO_2$, FSG $SiO_2$, Low k materials or oxide etc.

One more purpose of this invention is to provide the handling method of this invention slurry. The method can be two: one is to use only one kind of slurry for polishing. The other one is mixing two or more kinds of slurry together before polishing and then use the mixed one to do the polishing to use. For example, one can do the polishing using the mixed slurry which is from two slurries with different temperatures. As another example one can do the polishing using the mixed slurry which is from two slurries with different pH.

The advanced effect of This invention is realize the high removal rat, non corrosion happen to the substrate and low defectivity and high planar topography.

DETAILED DESCRIPTION OF THE INVENTION

Following are the embodiments through which this invention can be explained more detailed.

Embodiment 1

2 wt % fumed silica particle, mean size is 100 nm; 0.5 wt % ozone; 10 wt % hemoglobin; 0.5 wt % BTA, 0.1 wt % citric acid, 2% KOH, other is water, pH=5 temperature is 25° C.; down force is 1 psi; platen rotation speed 100 rpm; polishing head rotation speed: 105 rpm slurry flow rate: 200 ml/min.

Embodiment 2

5 wt % colloidal silica particle, mean size is 80 nm; 1.0 wt % ozone; 20 wt % hemoglobin; 0.1 wt % BTA, 0.1 wt % oxalic acid, 2.5% KOH, other is water, pH=5.5 temperature is 25; down force is 2 psi; platen rotation speed 150 rpm; polishing head rotation speed: 155 rpm, slurry flow rate: 300 ml/min.

Embodiment 3

3 wt % $Al_2O_3$ particle, mean size is 120 nm; 1.0 wt % ozone; 10 wt % myoglobin; 0.1 wt % BTA, 0.1 wt % tartaric acid, 2.8% $NH_4OH$, other is water, pH=6. Slurry is kept in two containers. One container's slurry is heated to temperature 37° C.; the other contain slurry temperature is kept at 25° C.; before polishing, mixing this two different temperature slurries, then do the polishing by using the mixed slurry. Down force is 1 psi; platen rotation speed 70 rpm; polishing head rotation speed: 80 rpm, slurry flow rate: 100 ml/min for each slurry.

Embodiment 4

7 wt % CuO particle, mean size is 70 nm; 0.2 wt % ozone; 5 wt % hemoglobin; 0.1 wt % BTA, other is water. Slurry is kept in two containers. KOH is added into one container slurry to make pH up to 5, at this point, the KOH concentration is 2 wt %; KOH is added into another container slurry to make pH up to 9, at this point, the KOH concentration is 3 wt %; before polishing, mixing this two different pH slurries, then do the polishing using the mixed slurry. down force is 1 psi; platen rotation speed 70 rpm; polishing head rotation speed: 80 rpm, slurry flow rate: 100 ml/min for each slurry Embodiment 5

1 wt % fumed silica particle, mean size is 100 nm; 0.01 wt % $O_2$; 0.1 wt % myoglobin; 0.5 wt % BTA, 0.1 wt % citric acid; 4 wt % $NH_4OH$; other is water. pH=12; 0° C.; down force is 1 psi; platen rotation speed 100 rpm; polishing head rotation speed: 105 rpm slurry flow rate: 200 ml/min.

Embodiment 6

30 wt % colloidal silica particle, mean size is 100 nm; 10 wt % ozone; 50 wt % hemoglobin; 0.5 wt % BTA, 0.1 wt % citric acid; 1 wt % $NH_4OH$; other is water. pH=3; 50° C.; down force is 1 psi; platen rotation speed 100 rpm; polishing head rotation speed: 105 rpm, slurry flow rate: 200 ml/min.

What is claimed is:

1. A chemical mechanical polishing slurry comprising at least one abrasive, one oxidant, and one big metallorganic compound; wherein the oxidants are selected from ozone, oxygen, compound containing oxygen, a compound containing sulfate, a compound containing peroxide or persulfur or their combination; and wherein the big metallorganic compound contains metal and peptide chain structure.

2. The slurry according to claim 1, wherein the slurry contains 1 wt. %-30 wt. % abrasive and 0.01 wt. %-10 wt. % oxidant.

3. The slurry according to claim 1, wherein the big metallorganic compound is selected from hemoglobin and its derivates or myoglobin and its derivates, or their combination.

4. The slurry according to claim 3, wherein the content of hemoglobin and its derivates or myoglobin and its derivates, or their combination, is 0.1-50 wt. %.

5. The slurry according to claim 4, wherein the slurry temperature is between 0° C.-50° C.

6. The slurry according to claim 5, wherein the slurry temperature is 25° C.-50° C.

7. The slurry according to claim 1, wherein the slurry pH is 3-12.

8. The slurry according to claim 1, wherein the slurry pH is 6-8.

9. The slurry according to claim 1, wherein the abrasive is selected from the one or several of $SiO_2$, polymer, metallic oxide and metal particles.

10. The slurry according to claim 9, wherein the abrasive metallic oxide is $Al_2O_3$, $CeO_2$, lanthanum oxide, samarium oxide, Copper oxide or $Cu_2O$; The metal is Cu, W, Al, Fe, Ni, Ag, Pt or Au.

11. The slurry according to claim 1, wherein the surface specific area of the abrasive is: 20-20000 $m^2/g$.

12. The slurry according to claim 1, wherein the abrasive particle mean size is: 5-500 nm.

13. The slurry according to claim 1, wherein the abrasive is selected from modified $SiO_2$, $Al_2O_3$, $CeO_2$, lanthanum oxide, samarium oxide, tungsten oxide, copper oxide or $Cu_2O$, organic or inorganic polymer or metal particle.

14. The slurry according to claim 1, wherein the abrasive is an empty core particle.

15. The slurry according to claim 1, wherein the abrasive can carry electricity.

16. The slurry according to claim 1, wherein the slurry further contains water or organic solvent; wherein the carrier can be solid or liquid, and wherein the liquid carrier is preferred to be the water or other organic solvent.

17. The slurry according to claim 16, wherein the organic solvent is ethanol.

18. The slurry according to claim 1, wherein the CMP slurry further contain film forming agent, dispersant agent, catalyst agent, complexing agent, and pH buffing agent or their combination.

19. The slurry according to claim 1, which can be applied to polish metal substrate or non metal substrate.

20. The slurry according to claim 19, wherein the metal substrate material is Cu, Ta, TaN, W, Al, Ag, Ti, TiN or Au; wherein the non-metal substrate material is polymer, BPSG $SiO_2$, FSG $SiO_2$, Low k materials or oxide etc.

* * * * *